United States Patent Office 3,383,332
Patented May 14, 1968

3,383,332
POLYMERIC BORON-NITROGEN COMPOUNDS AND PROCESS FOR THEIR PREPARATION
Elmar-Manfred Horn, Kurten, and Hans Niederprüm, Monheim, Germany, assignors to Farbenfabriken Bayer Aktiengesellschaft, Leverkusen, Germany, a corporation of Germany
No Drawing. Filed Feb. 2, 1965, Ser. No. 429,920
Claims priority, application Germany, Feb. 8, 1964, F 41,970
29 Claims. (Cl. 260—2)

ABSTRACT OF THE DISCLOSURE

Boron-nitrogen organic polymers having borohydride and boron halide groups connected directly to N-atoms, prepared by reacting at a temperature above about 0° C. (e.g., 0–100° C.) mixture of a borohydride (e.g., an alkali metal borohydride or mixtures of borohydrides) and a boron halide (e.g., boron trifluoride or an ether addition compound thereof or mixtures of such boron halides) with a di- or polynitrilo-substituted organic hydrocarbon and/or a di- or polynitrilo-substituted hydrocarbon substituted di- or polysiloxane, optionally in the presence of a liquid diluent such as an ether, and optionally in the presence of filler particles.

The present invention relates to polymeric boron-nitrogen compounds and a process for their preparation, and more particularly to polymeric boron-nitrogen compounds in which one or more disiloxane or polysiloxane groups may be present in the polymer chain.

Reactions of boron compounds with nitriles are known per se. Thus, according to Chem. Rev. 31, 1 (1942), an unstable complex of empirical formula $CH_3CN \cdot BH_3$ is obtained from acetonitrile and diborane. A reaction has also been observed between acetonitrile and boron trifluoride [Acta Cryst. 3, 121 (1950)], in which a complex of the formula $CH_3CN \cdot BF_3$ results. Furthermore, the preparation of borazines from aliphatic mononitriles and diborane (U.S. Patent 3,008,988 and J. Chem. Soc. (London) 1960, No. 6, pp. 2614–17) is known. Also, according to German Patent DAS 1,147,944, B,B',B''-trihydrido-N,N''-triorganoborazines can be prepared by the reaction of mononitriles with borohydrides or aluminohydrides and boron halides. Finally, Belgian Patent 630,994 describes a process for the production of polymeric boron-nitrogen compounds, which consists of reacting mononitriles or polynitriles with amine boranes.

It is an object of the present invention to provide particular polymeric boron-nitrogen compounds, which may contain silicon, and which possess advantageous properties.

It is another object of the present invention to provide boron-nitrogen polymers which are obtained in the form of resins, pastes, rubber-like materials or oils.

It is a further object of the present invention to provide boron-nitrogen compounds of the foregoing type which may be used as lubricants, lubricant additives, insulating materials and intermediates for the production of thermally stable and neutron absorbing high polymers.

It is still another object of the present invention to provide a process for preparing polymeric boron-nitrogen compounds which may contain silicon.

It is a further object of the present invention to provide a process in which cross-linked as well a linear polymer chains are formed.

It is a further object of the present invention to provide for the production of boron-nitrogen polymers of the foregoing type in which a filled material is provided.

It is still another object of the present invention to provide a process for the production of boron-nitrogen polymers of the foregoing type in which finely divided inert inorganic solids are incorporated into the reaction mixture, so that the boron-nitrogen polymer recovered will contain such solids as filler materials therein.

It is still a further object of the present invention to provide a process for the production of boron-nitrogen polymers in which the properties of the polymer may be controlled by the type of starting materials and by the proportions of the various starting materials contemplated.

It has been found in accordance with the present invention that particular polymeric, organic boron-nitrogen compounds, whcih may contain silicon, may now be provided by reacting nitriles (i.e. organo cyanides) with boron compounds. Generally, those nitriles of the formula $$R(CN)_z \qquad (I)$$

in which R represents a hydrocarbon radical which may contain one or more silicon atoms and z is a whole number of at least 2, my be reacted with a mixture of borohydrides and boron halides or borohalide-adducts at temperatures above about 0° C., preferably at temperatures substantially between about 40 and 100° C., whereupon the resulting boron-nitrogen organic hydrocarbon polymer formed may be readily recovered.

The polymers in accordance with the present invention contain small amounts of hydridic hydrogen (bonded directly to boron) as reactive groups and consequently act as weak reducing agents.

Depending upon the reaction conditions and the particular nitriles selected as starting materials, the polymers obtained may be in the form of resins, pastes, rubber-like materials or oils. The boron-nitrogen polymers prepared according to the present invention can be used advantageously as lubricants, lubricant additives, insulating materials and an intermediates, i.e. raw materials, for the production of thermally stable and neutron absorbing high polymers.

The nitriles which may be used according to the present invention can be described by the above formula. If the radical R of such formula contains several silicon atoms, then these are separated from one another by an intermediate oxygen atom. In di- or polynitrile substituted siloxanyl compounds, the nitrile groups are each bonded to the silicon atom in question through at least two carbon atoms.

In accordance with one particular feature of the present invention, the nitriles in question may have the general formula $$R'(CN)_z \qquad (II)$$

in which R' represents alkyl, alkenyl, alkynyl, and aryl radicals, as well as the aforesaid radicals which have been mono- or poly-substituted with one or more halogen atoms, alkyl, aryl, alkoxy and/or aryloxy groups, z is an integer of at least 2, generally of between 2 and 10, preferably of between 2 and 6 and most preferably of between 2 and 4. Typical examples of organic silicon-free, di- and/or polynitriles in accordance with the foregoing formula include: malonic acid dinitrile, succinic acid dinitrile, glutaric acid dinitrile, adipic acid dinitrile, pimelic acid dinitrile, suberic acid dinitrile, diethylmalonic acid dinitrile, tetraphenylsuccinic acid dinitrile, cyanoform, 1,2,3-tricyanopropane, 1,1,3,3-tetracyanopropane, phthalodinitrile, isophthalodinitrile, terephthalodinitrile, 2-cyanobenzyl cyanide, 3,4-dicyanobiphenyl, 2,2'-dimethyl-5,5'-dicyanobiphenyl, 1,4-dicyanonaphthalene, 3,10-dicyanoperylene, 3,4,9-tricyanoperylene, tricyanodibenzyl, bis-(2-cyanobenzyl)-acetonitrile, 2-phenyl-1,1,2-tricyanoethane, 1-phenyl-1,2,2-tricyanobutane, 1,3,5-tricyano - 2,4,6 - trimethylbenzene, 1,4-dicyanobutene-(2),

1,1,2,2-tetracyanoethylene, vinylidene cyanide, 1,1,3,3-tetracyanopropene and cyclohexenedicarboxylic acid dinitrile.

In accordance wtih another particular feature of the present invention, the nitriles in question contain silicon and are provided in the form of di- and polynitriles which have the following formula:

$$R''_p(Z-C\equiv N)_q \quad (III)$$

in which Z may be a group such as alkylene, arylene or a group of the formula

(IV)

in which A is an alkylene group, R'' may be a disiloxane or straight chain-, branched chain-, or cyclic polysiloxane radical, $q$ represents a whole number of at least 2 and $p$ a whole number of at least 1. The disiloxane and polysiloxane radicals, each may include $-(Z-C\equiv N)_q$ groups one one or more silicon atoms.

As for the chain or ring type siloxane nitriles usable in accordance with the present invention, these may contain, in addition to one or more siloxane linkages, two or more nitrile groups, such nitrile groups each being bonded to the silicon atoms present through at least two carbon atoms. Accordingly, the nitrile groups can be connected to the silicon atoms through aromatic or aliphatic groups. The remaining valences of the silicon atoms of such siloxane derivatives may be saturated with alkyl, or aryl groups, especially with methyl or phenyl radicals.

Typical examples of the siloxane nitrile compounds which may be used in accordance with the present invention are: 1,3-bis(γ-cyanopropyl)-1,1,3,3-tetramethyldisiloxane, 1,3 bis(p-cyanophenyl)-1,1,3,3-tetramethyldisiloxane, polymeric siloxanes of the constitutions (in which $x$ is a whole number of at least 1 and $y$ is a whole number of at least 2):

$(CH_3)_3SiO[Si(CH_3)_2O]_x(CH_3Si$
$\qquad [(CH_2)_nCN]O)_ySi(CH_3)_3$ with $n=2,3,4$

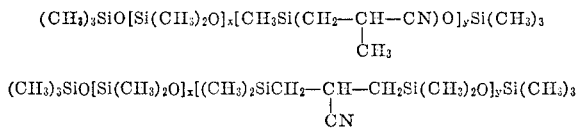

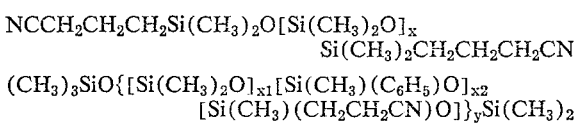

$NCCH_2CH_2CH_2Si(CH_3)_2O[Si(CH_3)_2O]_x$
$\qquad Si(CH_3)_2CH_2CH_2CH_2CN$ $(CH_3)_3SiO\{[Si(CH_3)_2O]_{x1}[Si(CH_3)(C_6H_5)O]_{x2}$
$\qquad [Si(CH_3)(CH_2CH_2CN)O]\}_ySi(CH_3)_2$ It will be appreciated that where olefinic or acetylenic unsaturated di- or polynitriles are used, then under the conditions of the instant process a hydroboration of the double or triple bond usually occurs along with the reaction of the borohydride-boron halide mixture with the nitrile groups, whereupon the chief result will be additional cross-linking of the polymer chains, especially where silicon-containing boro-nitrogen polymers are concerned.

The boron halide compounds which may be used in accordance with the present invention include those compounds having the formula $$BX_3 \quad (V)$$

in which X stands for fluorine, chlorine, bromine, or iodine.

Preferably, because of the better dosaging attributes, the boron trifluoride compounds are generally used in the form of addition compounds, particularly with ethers, such for example boron trifluoride-diethyl ether or boron trifluoride-tetrahydrofuran. In the interest of maintaining production costs at the lowest practical level under the circumstances, boron trifluoride and/or its addition compounds are preferred. It will be appreciated that various other boron trifluoride addition compounds may be used, such as dilower alkyl ethers, e.g. $C_2$–$C_3$ dialkyl ethers, including dimethyl-, diethyl-, dipropyl- etc. ethers, cyclic ethers, tetrahydrofuran, tetrahydropyran, dioxan etc.

The borohydrides which may be used in accordance with the present invention include all borohydrides, but in the interests of practical economy for large scale production, the alkali borohydrides and the alkaline earth borohydrides are suitable, particularly the comparatively inexpensive sodium borohydride. Nevertheless, the corresponding lithium, potassium, rubidium and cesium alkali borohydrides as well as calcium, strontium, barium, etc., alkaline earth borohydrides are contemplated in accordance with the instant process for use with appropriate boron halide compounds of the foregoing type for producing the polymeric boron-nitrogen compounds in question.

As the artisan will appreciate, solvents and/or suspension agents may be of advantage in carrying out the instant process, and these include ethers, and especially cycloaliphatic ethers, such as tetrahydrofuran, tetrahydropyran, dioxan, etc., especially cyclic $C_5$–$C_6$ oxaaliphatic ethers.

In general, in accordance with the process of the present invention, for the complete conversion of the nitriles in question, which may have the formula $$R(CN)_z \quad (I')$$

for each mol of nitrile group present (i.e. —CN group), 1 mol of boron halide compound and 0.75 mol of alkali borohydride should be used. Where olefinic or acetylenic, i.e., unsaturated, nitriles are used, then it is appropriate to use a higher ratio of boron halide compound and borohydride per nitrile group, because of the frequently occurring hydroboration of such multiple bonds which proceeds simultaneously with the main reaction. On the other hand, it is also of advantage in certain instances, especially where it is desired to modify the properties of the polymers produced in accordance with the invention, to convert only partially the nitriles employed with the borohydrides and boron halide compounds. In this connection, a smaller ratio of boron halide compound and borohydride to nitrile group is necessary than that indicated above.

The instant process is carried out at temperatures at above about 0° C. and appropriately between substantially about 40–100° C., although generally temperatures substantially between about 0 and 100° C. are still possible. The low conversion temperatures contemplated herein permit the process to be carried out without pressure, although as the artisan will appreciate the reaction may also be effected under pressure, for example under positive pressure, preferably of 1 to 5 atmospheres, exerted by a nitrogen atmosphere in the closed system used.

In addition to the use of olefinically or acetylenically unsaturated di- or polynitriles, and in addition to the partial conversion of the di- or polynitriles, it is further possible to influence the properties of the polymeric boron-nitrogen compounds in question, which may contain silicon, by employing the nitrile component in the reaction in the form of random nitrile mixtures rather than as a definite uniform compound per se.

The properties of the polymeric boron-nitrogen compounds produced in accordance with the present invention, may be varied significantly, in accordance with an alternate feature of the present invention by carrying out the conversion of the nitriles or nitrile mixtures with borohydrides and boron halides or boron halide adducts in the presence of finely divided inorganic solids which are inert with respect to the starting reaction materials. Such inert finely divided solids include for example compounds well known as fillers or pigment, such as silicon dioxide, titanium dioxide, zinc oxide, magnesium oxide, carbon black calcium oxide, calcium carbonate, iron oxide, etc., as well as salts, especially halogen salts with the alkali metals and/or boron, such as sodium fluoride, potassium chloride, sodium tetrafluoborate, etc. The inert finely divided inorganic solids of the foregoing type may be used alone or in admixture with one another. In the conversion of the nitriles in accordance with the instant process, such inert finely divided solids are enveloped by the polymeric boron-nitrogen compounds formed and thus such solid materials act as filler materials for the polymer mass. The quantity of filler materials of the foregoing type may be varied at random, but preferably such quantities should not amount to more than substantially about 50% by weight of the end product. The inert finely divided solids should have a particle size below 0.5 mm., being insoluble or at least difficultly soluble in organic solvents. The silicon dioxide may be used in the form of e.g., quartz sand, as well as in the form of finely divided fillers, having particle sizes of below 10μ and specific surface areas of between about 80 and 300 square meters per gram according to the Brunauer, Emmett, Teller method.

The following examples are set forth for the purposes of illustration and not limitation of the present invention.

Example 1

Into a round bottomed flask having a stirrer, reflux condenser, immersion thermometer and dropping funnel, which contains a suspension of 3 g. (0.08 mol) sodium borohydride in a solution of 200 g., α,ω-bis-(γ-cyanopropyl) polymethyl-polysiloxane, according to the formula

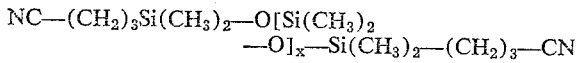

wherein $x$ has a value of about 72, having a molecular weight of about 5332 and a 0.50% nitrogen content, in about 350 ml. tetrahydrofuran, 10 g. (1/14 mol, i.e., 0.07 mol) boron trifluoride-tetrahydrofuran is added dropwise within about five minutes. The temperature of the reaction mixture increases to about 35° C. Thereafter, the reaction mixture is heated to boiling with reflux, and the reaction mixture slowly becomes turbid. After about 1½ hours a turbid viscous mass is obtained. This mass is diluted with 200–250 ml. tetrahydrofuran, briefly heated to boiling, filtered off from the sodium tetrafluoborate formed and from excess sodium borohydride, whereupon the clear filtrate is concentrated, and the reaction product is briefly heated in vacuum at about 100–130° C. In this way, 204 g. of a clear rubber-like polymerizate are obtained, having weak reducing action. Such polymeric boron-nitrogen compound is for example moderately soluble in carbon tetrachloride, and contains 0.81% boron, 0.66% nitrogen, about 0.005% $H_a$ (active hydrogen, i.e., hydridic hydrogen directly bound to boron) and possesses a softening point of about 200° C.

Example 2

In accordance with the procedure of Example 1, 1.78 g. (0.047 mol) sodium borohydride are converted in 400 ml. tetrahydrofuran with 6.75 g. (0.048 mol) boron trifluoride-tetrahydrofuran and 100 g. of an α,ω-bis-(γ-cyanopropyl)-polymethyl-polysiloxane, according to the formula

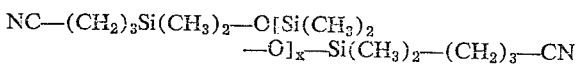

wherein $x$ has a value of about 40, having a molecular weight of about 2340 and a 0.9% nitrogen content. The reaction mixture is heated for about one hour to boiling with reflux, thereafter diluted with tetrahydrofuran and then filtered while hot. After concentrating the clear, colorless filtrate and heating the residue in vacuum at 135° C., 102 g. are obtained of a slightly turbid, rubber-like polymeric product containing 1.27% boron, 0.97% nitrogen, about 0.01% $H_a$ and 0.22% sodium (mainly in the form of sodium tetrafluoborate), having weak reducing action. This polymeric compound becomes highly fluid at about 210° C.

Example 3

In a solution of 50 g. of a polymethyl-polysiloxane, having 1.9% nitrogen, and carrying β-cyanoethyl groups as side chains, having the formula

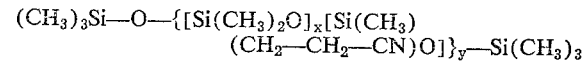

wherein $x$ has a value of 8 and $y$ a value of about 10, having a molecular weight of about 7200, are suspended 2.35 g. (0.062 mol) sodium borohydride in 500 ml. tetrahydrofuran. To this suspension at room temperature, 9.5 g. (0.068 mol) boron trifluoride-tetrahydrofuran are added dropwise. The reaction mixture is then heated to moderate boiling with reflux and the reaction product is worked up in accordance with the procedure of Example 1. In this way, 50 g. are obtained of a slightly yellow colored rubber-like product, having 1.78% nitrogen, 1.67% boron, about 0.001% $H_a$ as well as 0.17% sodium (mainly in the form of sodium tetrafluoborate), and having weak reducing action. Such product has a softening point of 155° C.

Example 4

180.5 g. of a sodium borohydride-quartz sand mixture, containing 41.9% of $NaBH_4$ (corresponding to 2 mol 100% $NaBH_4$) are suspended in a solution of 108 g. (1 mol) adipic-dinitrile in 4 l. tetrahydrofuran. Subsequently, into this suspension 280 g. (2 mol) boron trifluoride-tetrahydrofuran are added dropwise within 30 minutes. As a result, the reaction mixture increases from room temperature to about 40° C. For the completion of the conversion, the reaction mixture is heated to boiling with reflux and worked up according to the process of Example 1. In this way 150 g. are obtained of a white rubber-like polymerizate, containing 3.3% sodium tetrafluoborate, with 12.65% total boron, 17.02% nitrogen and 0.42% $H_a$. The polymerizate sinters under slight discoloration at 330° C.

Example 5

88 g. of sodium borohydride-quartz sand mixture containing 47.4% $NaBH_4$ (corresponding to 1.1 mol pure sodium borohydride) are suspended in a solution of 136 g. (0.66 mol) 3,4-dicyano-diphenyl in 3.5 l. tetrahydrofuran. To this suspension 187 g. (1.33 mol) boron trifluoride-tetrahydrofuran are added dropwise within about 30 minutes. In this way, the reaction mixture first turns green, then brown and finally yellow. Such reaction mixture is then heated for one to two hours at boiling with reflux, and thereafter the reaction product is worked up in accordance with the procedure of Example 1. 185 g. of a yellow-brown polymerizate are obtained, which for example is soluble in benzene, sinters at 195–200° C. and contains 62.7% carbon, 6.1% total hydrogen, 0.12% $H_a$, 9.55% nitrogen and 7.4% boron.

Example 6

In accordance with the procedure of Example 5, using 122.6 g. of a sodium borohydride-quartz sand mixture containing 41.9% $NaBH_4$ (corresponding to 1.36 mols pure sodium borohydride), 53.3 g. (0.66 mol) succinic acid dinitrile and 187 g. (1.33 mol) boron trifluoride-tetrahydrofuran, 117 g. are obtained of a gray pasty polymerizate, which is for example soluble in benzene, and which contains 46.1% carbon, 7.8% total hydrogen, 0.16% $H_a$, 13.35% nitrogen and 9.72% boron.

By extraction of the filtration residue, for example with tetrahydrofuran, a further quantity of boron-nitrogen polymer material may be isolated.

Example 7

In accordance with the procedures of Examples 5 and 6, using 85.3 g. (0.66 mol) phthalo-dinitrile, 41 g. (1.1 mol) sodium borohydride and 187 g. (1.33 mol) boron trifluoride-tetrahydrofuran, there are obtained 118 g. of a yellow-brown resinous polymerizate, which melts at 272° C. under discoloration, and which contains 53.8% carbon, 5.6% total hydrogen, 13.56% nitrogen and 10.74% boron.

Example 8

In a solution of 63.6 g. (0.6 mol) 1,4-dicyanobutene-(2) in 2.3 l. tetrahydrofuran, 87 g. are suspended of a sodium borohydride-quartz and mixture (corresponding to 1.08 mol pure sodium borohydride) containing 47.2% $NaBH_4$. To this suspension, 196 g. (1.4 mol) boron trifluoride-tetrahydrofuran are added dropwise at 50° C. within about 25 minutes, and the reaction mixture is heated for about 1½ hours at boiling with reflux. Such reaction mixture is then filtered while hot through a pressure-suction filter, whereupon 1,206 g. of a tetrahydrofuran-moist residue are obtained.

Five-sixths of this residue are dried at 140° C. in vacuum and subsequently ground in a ball mill. In this way, 222 g. of a powdery white resinous product are obtained, which sinters at 225° C. and contains 16.07% silicon dioxide, 9.52% boron, 5.7% nitrogen, 8.5% sodium, 27.65% fluorine, and 0.13% $H_a$.

One-sixths of the tetrahydrofuran-moist filtration residue is extracted in a Soxhlet apparatus for about six hours with the filtrate which contains tetrahydrofuran. The extract is concentrated, freed from volatile constituents in vacuum, whereby to obtain 10 g. of a polymeric boron-nitrogen-compound, easily discoloring at about 200° C., and which contains 7.54% nitrogen, 9.5% boron and 0.06% $H_a$. X-ray photographs establish that the extraction residue from the Soxhlet extraction consists essentially of silicon dioxide and sodium tetrafluoborate.

Example 9

In a solution of 22.7 g. ($3/14$ mol. i.e. 0.21 mol) 1,4-dicyano-butene-(2) and 27 g. (¼ mol) adipic-dinitrile in one l. of tetrahydrofuran are suspended 10 g. dry iron-(III)-oxide, 35 g. quartz sand and 32.3 g. (0.86 mol) sodium borohydride. To this suspension, 140 g. (1 mol) boron trifluoridetetrahydrofuran are added dropwise within about twenty minutes with mild external cooling. The reaction mixture is heated for about 2½ hours at boiling with reflux, and thereafter the major portion of the tetrahydrofuran is distilled off at normal pressure and the remaining volatile constituents are removed at 130° C. in vacuum. In this way, 199 g. of a polymeric boron-nitrogen compond are obtained which is brick red colored and brittle, which sinters at about 350° C., and which contains as filler materials 15.31% silicon dioxide, 5.45% iron-(III)-oxide and 22.2% sodium tetrafluoborate and which has a total boron content of 9.36% and a nitrogen content of 6.26%.

Example 10

Examples 1 to 9 are repeated, respectively, using in each instance sodium-, lithium-, potassium-, calcium-, strontium-, and barium-borohydride, respectively, and boron-trifluoride, -trichloride, -tribromide, -triiodide, respectively, diethyl ether- and tetrahydrofuran-addition products of boron trifluoride, respectively, in tetrahydrofuran and tetrahydropyran, respectively, as solvent, with the following nitrile compounds, whereby in each case analogous products are obtained to those of Examples 1 to 9, which are obtained in the form of resins, pastes, rubber-like materials or oils, as the case may be, and which can be used as lubricants, lubricant additives, insulating materials and as intermediates, i.e. starting materials, for the production of thermally stable and neutron absorbing high polymers:

$$R'(CN)_z$$

Hydrocrabon nitriles of the following types: di- and tri-cyano methane; 1,1- and 1,2-dicyano-ethane; 1,1-, 1,2-, 2,2- and 1,3-dicyanopropane; 1,1-, 1,2-, 2,2-, 2,3-, and 1,4-dicyanobutane; 1,1-, 1,2-, 1,3-dicyano-2-methyl-propane; 1,1-, 1,2-, 2,2-, 1,3-, 2,3-, and 3,3-dicyanopentane; 1,1-, 1,2-, 1,3-, 1,4-, and 2,3-dicyano-2-methylbutane; 1-cyano-, 2-cyano-, 3-cyano-, and 4-cyano-(2-cyanomethyl)butane; the corresponding α,α-, α,β-, β,β-, α,γ-, and α,ω-dicyano-hexanes, -heptanes, -octanes, -nonanes, -decanes, -undecanes, -dodecanes, etc.; the corresponding α,α,α-, α,α,γ-, β,β,β-, γ,γ,γ-, ω,ω,ω-, α,α,β-, α,β,β-, α,β,γ-, α,γ,γ-, β,β,γ-, β,γ,γ-, α,α,ω-, α,ω,ω-, α,β,ω-, β,β,ω-, β,ω,ω-, α,γ,ω-, γ,γ,ω-, β,γ,ω-, and γ,ω,ω-tricyano $C_2$–$C_{12}$ linear and branched chain alkanes including the corresponding tricyano -ethanes, -propanes, -butanes, -2-methyl propanes, -2-methyl butanes, -pentanes, etc.; the corresponding polycyano $C_2$–$C_{12}$ linear and branched chain alkanes including the corresponding polycyano -ethanes, -propanes, -butanes, -2-methyl propanes, -2-methyl butanes, -pentanes, etc.; the corresponding di-, tri- and polycyano $C_2$–$C_{12}$ linear and branched chain alkenes and alkynes including the corresponding cyano-ethylenes, -propenes, -butenes, -2-methyl propenes, -2-methyl butenes, -pentenes, etc., -ethynes, -propynes, -butynes, -pentynes, etc.; the corresponding di-, tri- and polycyano aryls, including the corresponding cyano -phenyls, -naphthyls, -biphenyls, -perylenes, -benzyls, -dibenzyls, -ethyl-, -propyl-, -butyl-, etc., -phenyls, -naphthyls, -biphenyls, -benzyls, -dibenzyls, etc.; the corresponding mono-, di- and poly- -halo-, i.e. -chloro-, -bromo-, iodo-, and -fluoro-, $C_1$–$C_6$ linear and branched alkyl-, $C_6$–$C_{20}$-aryl-, $C_1$–$C_6$ linear and branched alkoxy-, and $C_6$–$C_{20}$ aryloxy- -substituted cyano-alkanes, -cyano-alkenes, -cyano-alkynes, and cyano-aryls of the foregoing type, etc.; and such cyano-alkanes, -alkenes, -alkynes and -aryls, having mixed halo-, $C_1$–$C_6$ linear and branched alkyl-, $C_6$–$C_{20}$ aryl, $C_1$–$C_6$ linear and branched alkoxy-, and $C_6$–$C_{20}$ aryloxy-substituents thereon;

$$R''_p(Z\!-\!C\!\equiv\!N)_q$$

siloxane nitriles of the following types:

(a) Disiloxane nitriles in which R'' is a disiloxane group having the formula $Y'_2Si\!-\!O\!-\!SiY'_2$; with $p=1$ and $q=2$;

(b) Linear polysiloxane nitriles in which R'' is a linear polysiloxane group having the formula

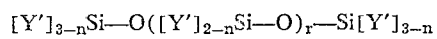

with $p=1$ and $n=1$ or 0, $p$ is an integer of at least 2 and with $\Sigma(n=1)=q$, $r$ is an integer of at least 2;

(c) Cyclic polysiloxane nitriles in which R'' is a cyclic polysiloxane group having the formula

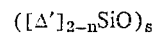

$p$, $n$ and $q$ having the same meaning as given under section (b) and $s$ being an integer of at least 3;

(d) Branched polysiloxane nitriles in which R'' is a branched polysiloxane group having the formula

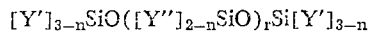

where Y'' is $[Y']_{3-n}SiO([Y'']_{2-n}SiO)_r$-group being present in each branched polysiloxane grouping, $p,n,r$ and $q$ having the same meaning as given under section (b), where in the case of each of the di-siloxane nitriles, linear polysiloxane nitriles, cyclic polysiloxane nitriles and branched polysiloxane nitriles, respectively Y' is an alkyl- or phenyl-group, preferably methyl or phenyl and Z is a linear or branched alkylene preferably a $C_1$–$C_3$ alkylene or arylene group.

Example 11

Example 10 is reepated using specifically the following dinitrile compounds:

di-, tri- and polycyano $C_1$–$C_6$ alkanes and -$C_1$–$C_6$ alkenes, including the α,ω-dicyano $C_1$–$C_6$ alkanes: malonic acid dinitrile, succinic acid dinitrile, glutaric acid dinitrile, adipic acid dinitrile, pimelic acid dinitrile, and suberic acid dinitrile; the γ,γ-dicyano $C_1$–$C_6$ alkanes; diethyl malonic acid dinitrile, etc.; the tricyano $C_1$–$C_6$ alkanes: cyanoform, 1,2,3-tricyano propane, etc.; the tetracyano $C_1$–$C_6$ alkanes: 1,1,3,3-tetracyano propane, etc.; the di-, tri- and polycyano $C_2$–$C_6$ alkenes: 1,4-dicyanobutene-(2), 1,1,2,2-tetracyanoethylene, vinylidine cyanide, 1,1,3,3-tetracyanopropene, etc.

Di-, tri- and polycyano mono- to penta- nuclear $C_6$–$C_{20}$ aryl-$C_1$–$C_6$ alkyl compounds, including the dicyano mononuclear $C_6$ aryl poly substituted $C_1$–$C_6$ alkanes: tetraphenyl succinic acid dinitrile, etc.; the dicyano mononuclear $C_6$ aryl-$C_1$–$C_6$ alkyl compounds: 2-cyanobenzyl-cyanide, etc.; the tricyano dinuclear $C_6$ aryl-$C_1$–$C_6$ alkyl compounds: tricyano dibenzyl, bis-(2-cyanobenzyl) acetonitrile, etc.; the tricyano mononuclear $C_6$ aryl compounds: 2-phenyl-1,1,2-tricyanoethane, 1-phenyl-1,2,2-tricyanobutane, etc.; the tricyanopoly $C_1$–$C_6$ alkyl mononuclear $C_6$ aryl compounds: 1,3,5-tricyano-2,4,6-trimethyl benzene, etc., and the like;

Siloxane nitriles including the 1,3-bis-(cyano $C_1$–$C_6$ alkyl)-1,1,3,3-tetra $C_1$–$C_6$ alkyl disiloxanes: 1,3-bis-(γ-cyanopropyl)-1,1,3,3-tetramethyl disiloxane, etc.; the 1,3-bis-(cyano mononuclear $C_6$ aryl)-1,1,3,3-tetra $C_1$–$C_6$ alkyl disiloxanes: 1,3-bis-(p-cyano phenyl)-1,1,3,3-tetramethyl disiloxane, etc.;

The polymer siloxanes of the following constitution, in which x and y are whole numbers having a value from 1 to 10 and n is a whole number having a value from 2 to 3.

$(CH_3)_3SiO[Si(CH_3)_2O]_x(CH_3Si[(CH_2)_nCN]O)_ySi(CH_3)_3$ in which n equals 2,3

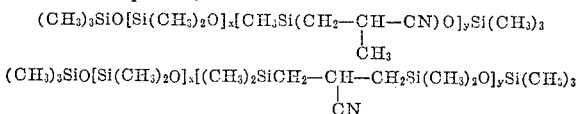

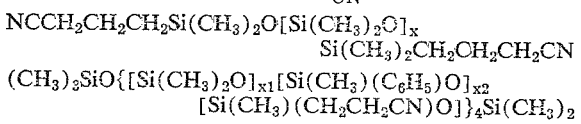

$NCCH_2CH_2CH_2Si(CH_3)_2O[Si(CH_3)_2O]_x$
$Si(CH_3)_2CH_2CH_2CH_2CN$ $(CH_3)_3SiO\{[Si(CH_3)_2O]_{x1}[Si(CH_3)(C_6H_5)O]_{x2}[Si(CH_3)(CH_2CH_2CN)O]\}_4Si(CH_3)_2$ whereupon corresponding results to those obtained in Examples 1 to 10 are achieved with the polymers having resinous, pasty, rubber-like and oily consistencies, rendering them useful as lubricants, lubricant additives, insulating materials and intermediates, i.e. starting materials, for the production of thermally stable and neutron absorbing high polymers.

In the same way, under substantially the same conditions, corresponding results may be obtained using the following nitriles:

1,1-dicyano pentyne; 1-chloro-2,3-dicyano butane; 3-bromo-1,2-dicyano propene-1; 2-iodo-1,2-dicyano butyne-3; 1,6-dibromo-2,5-dicyano benzene; 3,5-dicyano toluene; 1 - phenyl - 2,2 - dicyano propane; 1 - phenyl-1,2-dicyano butene-3; 2-naphthyl-1,3-dicyano pentyne-4; 1-methoxy-2,3-dicyano butane; 3-methoxy-2,4-dicyano hexane-5; 2-ethoxy - 1,3 - dicyano pentyne-4; 1-butoxy-2,4,6-tricyano benzene; 1-phenoxy-3,3-dicyano heptane; 1-(α-naphthyloxy)-2,3-dicyano butene-3; 2-phenoxy-1,3-dicyano pentyene-4; and 1-(α-naphthyloxy)-3,5-dicyano benzene.

Broadly, in accordance with the present invention, a process may now be provided for the production of boron-nitrogen organic polymers, optionally containing silicon, from boron compounds and nitriles, which comprises reacting at a temperature above about 0° C., and preferably substantially between about 40 and 100° C., a mixture of a borohydride, such as a member selected from the group consisting of alkali metal borohydride and mixtures of alkali metal borohydrides, and a boron halide compound, such as a member selected from the group consisting of boron trihalide, mixtures of boron trihalides, boron trifluoride addition compound with cycloalkyl ether, mixtures of boron trifluoride compounds with cycloalkyl ethers, and mixtures of the foregoing with a nitrile of the formula $$R(CN)_z$$

in which R represents an organic hydrocarbon radical and z is a whole number having a value of at least two, whereby the resulting boron-nitrogen organic hydrocarbon polymer, optionally containing silicon, will be formed. Preferably, the boron halide compound used is boron trifluoride or an ether addition compound of boron trifluoride. Besides using nitriles containing carbon and hydrogen hydrocarbon radicals, such nitriles may contain siloxyl groups. In the usual case, polymers having favorable properties may be obtained where the borohydride and boron halide used are in a mol ratio of about 0.75:1 per mol of nitrile group present in the starting organic hydrocarbon nitrile. The boron-nitrogen organic polymer produced contains borohydride and boron halide groups connected directly to nitrogen atoms, and optically also contains disiloxane linkages, each of which impart to the polymer desirable properties permitting the use of the same for the above stated purposes. Furthermore, favorable properties are imparted to the polymer where inorganic solid particles in finely divided, substantially anhydrous form are present as filler materials, which particles may be incorporated by including the same in the reaction mixture during the production process.

In accordance with a specific embodiment, therefore, the nitrile may have the formula $$R'(CN)_z$$

in which z has the foregoing meaning and R' represents a member selected from the group consisting of unsubstituted alkyl, alkenyl, alkynyl, and aryl; as well as alkyl, alkenyl, alkynyl, and aryl, which is substituted with at least one substituent selected from the group consisting of halo, alkyl, aryl, alkoxy, aryloxy, and mixtures of such substituents.

In accordance with another embodiment of the present invention, the nitrile used may be a siloxane-hydrocarbon nitrile which contains at least one disiloxane linkage as well as at least two nitrile groups. More specifically, the silicon-containing hydrocarbon nitrile used may have the formula $$R''_p(Z—C≡N)_q$$

in which R'' represents a member selected from the group consisting of disiloxanes having the formula $$Y'_2Si—O—SiY'_2$$

linear polysiloxanes having the formula $$[Y']_{3-n}Si—O([Y']_{2-n}Si—O)_r—Si[Y']_{3-n}$$

cyclic polysiloxanes having the formula $([Y']_{2-n}SiO)_s$, branched polysiloxanes having the formula $$[Y']_{3-n}SiO([Y'']_{2-n}SiO)_rSi[Y']_{3-n}$$

Y'' represents a member selected from the group consisting of $[Y']_{3-n}SiO([Y'']_{2-n}SiO)_r$ and Y' with at least one $[Y']_{3-n}SiO([Y'']_{3-n}SiO)_r$ member present, Y' represents a member selected from the group consisting of alkyl, aryl and mixtures thereof, Z represents a member selected from the group consisting of linear alkylene, branched alkylene and arylene, p and r are whole numbers having the value of at least 1, q is a whole number having a value of at least 2, s is a whole number having a value of at least 3, n is a whole number having a value selected from the group consisting of 0 and 1, with the provision that q amounts to $\Sigma(n=1)$.

As used in the specification and claims herein, the following terms will preferably have the meanings indicated:

Alkyl.—With a special regard to R', and Y'' as used herein, alkyl includes $C_1$–$C_{12}$ linear and branched alkyl groups such as methyl to dodecyl alkyl groups which may containin lower alkyl side chains such as $C_1$–$C_6$ (methyl to hexyl) lower alkyl side chains;

11

Alkenyl.—With especial regard to R' as used herein, alkenyl includes $C_2$–$C_{12}$ linear and branched alkenyl groups such as vinyl to dodecenyl groups which may contain lower alkyl side chains such as $C_1$–$C_6$ (methyl to hexyl) lower alkyl side chains;

Alkynyl.—With especial regard to R' as used herein, alkynyl includes $C_2$–$C_{12}$ linear and branched alkynyl groups such as ethynyl to dodecynyl alkynyl groups which may contain lower alkyl side chains such as $C_1$–$C_6$ (methyl to hexyl) lower alkyl side chains;

Aryl.—With especial regard to R', and Y' as used herein, aryl includes $C_6$–$C_{20}$ mono to polynuclear aryl such as phenyl, diphenyl, naphthyl, perylene, etc.;

Aralkyl.—With especial regard to R' as used herein, aralkyl includes $C_6$–$C_{20}$ aryl-$C_1$–$C_{12}$ alkyl such as benzyl, dibenzyl, naphthylethyl, perylene octyl, biphenyl pentyl, etc.;

Alkaryl.—With especial regard to R' as used herein, alkaryl includes mono-, di- and poly-$C_1$–$C_{12}$ alkyl substituted $C_6$–$C_{20}$ aryl, such as tolyl, dimethyl-phenyl, butyl-naphthyl, dodecyl-perylene, heptyl-xenyl;

Alkoxy.—With especial regard to R' as used herein, alkoxy includes $C_1$–$C_{12}$ alkoxy (methoxy to dodecyloxy) groups which may contain lower alkyl side chains such as $C_1$–$C_6$ (methyl to hexyl) lower alkyl side chains;

Aryloxy.—With especial regard to R' as used herein, aryloxy includes $C_6$–$C_{20}$ mono to polynuclear aryloxy groups, such as phenoxy, diphenoxy, naphthyloxy, perylene-oxy, etc.;

Alkylene.—With especial regard to Z as used herein, alkylene includes $C_1$–$C_{12}$ alkylene groups such as methylene to dodecylene groups, i.e. polymethylene groups;

Arylene.—With especial regard to Z as used herein, arylene includes $C_6$–$C_{20}$ arylene such as phenylene, biphenylene, naphthylene, perylene, etc., i.e. in which the arylene group has two free valences;

CH(alkylene)$_3$.—With especial regard to Z as used herein CH(alkylene)$_3$ contemplate particularly $C_1$–$C_{12}$ alkylene groups as defined hereinabove.

With regard to the definition of alkyl, alkenyl, alkynyl, and aryl for denoting groups covered by R' herein, such groups may be mono-, di-, or poly-substituted with one or more (i.e. mixtures) of the following groups: halo, including chloro, bromo, iodo, and/or fluoro; alkyl as defined hereinabove; aryl as defined hereinabove; alkoxy as defined hereinabove; and aryloxy as defined hereinabove; in this instance, the stated group being a separate substituent on the main group in the case where such main group, i.e. alkyl, alkenyl, alkynyl, and aryl, is a substituted group.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Process for the production of boron-nitrogen organic polymers from boron compounds and nitriles, which comprises reacting at a temperature above about 0° C. a mixture of a borohydride and a boron halide compound with a nitrile of the formula $$R(CN)_z$$

in which R represents a radical selected from the group consisting of an organic hydrocarbon, a hydrocarbon-substituted disiloxane and a hydrocarbon-substituted polysiloxane and z is a whole number having a value of at least 2, and recovering the resulting boron-nitrogen organic hydrocarbon polymer formed.

2. Process according to claim 1 wherein said temperature is substantially between about 0 and 100° C., and said borohydride is an alkali metal borohydride.

3. Process according to claim 2 wherein said boron halide compound is boron trifluoride.

4. Process according to claim 2 wherein said boron halide compound is an ether addition compound of boron trifluoride.

5. Process according to claim 1 wherein said R radical is selected from the group consisting of a hydrocarbon-substituted disiloxane and a hydrocarbon-substituted polysiloxane.

6. Process according to claim 1 wherein the reaction is carried out in an ether as liquid diluent.

7. Process according to claim 6 wherein said diluent is a cycloalkyl ether.

8. Process according to claim 1 wherein a mixture of borohydrides is used.

9. Process according to claim 1 wherein a mixture of boron halide compounds is used.

10. Process according to claim 1 wherein at least two different nitriles are used.

11. Process according to claim 1 wherein a mixture of hydrocarbon nitrile and silicon-hydrocarbon nitrile is employed.

12. Process according to claim 1 wherein the reaction is carried out in the presence of inorganic solid particles inert to the reactants and which act as filler for the polymer mass.

13. Process according to claim 12 wherein said particles are in finely divided, substantially anhydrous form.

14. Process according to claim 1 wherein said hydrocarbon radical contains a plurality of siloxy groups.

15. Process according to claim 1 wherein said borohydride and boron halide are used in the mol ratio of 0.75:1 per mol of nitrile group.

16. Process for the production of boron-nitrogen organic polymers from boron compounds and nitriles, which comprises reacting at a temperature substantially between about 0 and 100° C., a mixture of alkali metal borohydride and a boron trihalide compound with a nitrile of the formula $$R'(CN)_z$$

in which R' represents a member selected from the group consisting of unsubstituted alkyl, alkenyl, alkynyl, and aryl; as well as alkyl, alkenyl, alkynyl, and aryl, which is substituted with at least one substituent selected from the group consisting of halo, alkyl, aryl, alkoxy, aryloxy, and mixtures of such substituents; and z is a whole number having a value of at least 2, and recovering the resulting boron-nitrogen organic hydrocarbon polymer formed.

17. Process according to claim 16 wherein the reaction is carried out in the presence of inorganic solid particles in finely divided, substantially anhydrous form, which are inert to the reactants and which act as filler for the polymer mass.

18. Process for the production of boron-nitrogen organic polymers from boron compounds and nitriles, which comprises reacting at a temperature substantially between about 0 and 100° C. a mixture of a member selected from the group consisting of alkali metal borohydride and mixtures of alkali metal borohydrides, and a member selected from the group consisting of boron trihalide, mixtures of boron trihalides, boron trifluoride addition compound with cycloalkyl ether, and mixtures of the foregoing, with a siloxane-hydrocarbon nitrile containing at least one disiloxane linkage, and recovering the resulting boron-nitrogen siloxane-hydrocarbon polymer formed, said siloxane-hydrocarbon nitrile containing at least two nitrile groups.

19. Process for the production of boron-nitrogen organic polymers from boron compounds and nitriles, which comprises reacting at a temperature substantially between about 0 and 100° C. a mixture of an alkali metal borohydride and a boron trihalide compound with a silicone-containing hydrocarbon nitrile of the formula $$R''_p(Z-C\equiv N)_q$$

in which R'' represents a member selected from the group consisting of disiloxanes having the formula $$[Y']_2Si-O-Si[Y']_2$$

linear polysiloxanes having the formula $$[Y']_{3-n}SiO([Y']_{2-n}SiO)_r Si[Y']_{3-n}$$

cyclic polysiloxanes having the formula $$([Y']_{2-n}SiO)_s$$

branched polysiloxanes having the formula $$[Y']_{3-n}-SiO([Y'']_{2-n}SiO)_r Si[Y']_{3-n}$$

Y'' represents a member selected from the group consisting of $[Y']_{3-n}SiO([Y'']_{2-n}SiO)_r$ and Y' with at least one $$[Y']_{3-n}SiO([Y'']_{2-n}SiO)_r$$

member present, Y' represents a member selected from the group consisting of alkyl, aryl and mixtures thereof, Z represents a member selected from the group consisting of linear alkylene, branched alkylene and arylene, p and r are whole numbers having the value of at least 1, q is a whole number having a value of at least 2, s is a whole number having a value of at least 3, n is a whole number having a value selected from the group consisting of 0 and 1, with the provision that q amounts to $\Sigma(n=1)$.

20. Process according to claim 19 wherein the reaction is carried out in the presence of inorganic solid particles in finely divided, substantially anhydrous form, which are inert to the reactants and which act as filler for the polymer mass.

21. Boron-nitrogen organic polymer having borohydride and boron halide groups connected directly to N-atoms, which is prepared by reacting at a temperature above about 0° C. a mixture of a borohydride and a boron halide compound with a nitrile of the formula $$R(CN)_z$$

in which R represents a radical selected from the group consisting of an organic hydrocarbon, a hydrocarbon-substituted disiloxane and a hydrocarbon-substituted polysiloxane and z is a whole number having a value of at least 2, and recovering the resulting boron-nitrogen organic hydrocarbon polymer formed.

22. Polymer according to claim 21 wherein a plurality of siloxy linkages are contained therein.

23. Polymer accordding to claim 21 wherein disiloxane linkages are contained therein.

24. Polymer according to claim 21 wherein inorganic solid particles in finely divided, substantially anhydrous form are contained therein as filler.

25. Boron-nitrogen hydrocarbon polymer having borohydride and boron halide groups connected directly to N-atoms, which is prepared by reacting at a temperature substantially between about 0 and 100° C. a mixture of an alkali metal borohydride and a boron trihalide compound with a nitrile of the formula $$R'(CN)_z$$

in which R' represents a member selected from the group consisting of unsubstituted alkyl, alkenyl, alkynyl, and aryl; as well as alkyl, alkenyl, alkynyl, and aryl, which is substituted with at least one substituent selected from the group consisting of halo, alkyl, aryl, alkoxy, aryloxy, and mixtures of such substituents; and z is a whole number having a value of at least 2, and recovering the resulting boron-nitrogen organic hydrocarbon polymer formed.

26. Polymer according to claim 25 wherein inorganic solid particles in finely divided, substantially anhydrous form are contained therein as filler.

27. Boron-nitrogen organic polymer having borohydride and boron halide groups connected directly to N-atoms, which is prepared by reacting at a temperature substantially between about 0 and 100° C. a mixture of a member selected from the group consisting of alkali metal borohydride and mixtures of alkali metal borohydrides, and a member selected from the group consisting of boron trihalide, mixtures of boron trihalides, boron trifluoride addition compound with cycloalkyl ether, and mixtures of the foregoing, wth a siloxane-hydrocarbon nitrile containing at least one disiloxane linkage, and recovering the resulting boron-nitrogen siloxane-hydrocarbon polymer formed, said siloxane-hydrocarbon nitrile containing at least two nitrile groups.

28. Boron-nitrogen organic polymer having borohydride and boron halide groups connected directly to N-atoms, which is prepared by reacting at a temperature substantially between about 0 and 100° C. a mixture of an alkali metal borohydride and a boron trihalide compound with a silicon-containing hydrocarbon nitrile of the formula $$R''_p(Z-C\equiv N)_q$$

in which R'' represents a member selected from the group consisting of disiloxanes having the formula $$[Y']_2Si-O-Si[Y']_2$$

linear polysiloxanes having the formula $$[Y']_{3-n}SiO([Y']_{2-n}SiO)_r Si[Y']_{3-n}$$

cyclic polysiloxanes having the formula $$([Y']_{2-n}SiO)_s$$

branched polysiloxanes having the formula $$[Y']_{3-n}-SiO([Y'']_{2-n}SiO)_r Si[Y']_{3-n}$$

Y'' represents a member selected from the group consisting of $$[Y']_{3-n}SiO([Y'']_{2-n}SiO)_r$$

and Y' with at least one $$[Y']_{3-n}SiO([Y'']_{2-n}SiO)_r$$

member present, Y' represents a member selected from the group consisting of alkyl, aryl and mixtures thereof, Z represents a member selected from the group consisting of linear alkylene, branched alkylene and arylene, p and r are whole numbers having the value of at least 1, q is a whole number having a value of at least 2, s is a whole number having a value of at least 3, n is a whole number having a value selected from the group consisting of 0 and 1, with the provision that q amounts to $\Sigma(n=1)$.

29. Polymer according to claim 28 wherein inorganic solid particles in finely divided, substantially anhydrous form are contained therein as filler.

No references cited.

DONALD E. CZAJA, *Primary Examiner.*

M. I. MARQUIS, *Assistant Examiner.*

UNITED STATES PATENT OFFICE
CERTIFICATE OF CORRECTION

Patent No. 3,383,332  
May 14, 1968

Elmar-Manfred Horn et al.

It is certified that error appears in the above identified patent and that said Letters Patent are hereby corrected as shown below:

Column 1, line 45, "-N,N''-" should read -- -N,N',N''- --; line 67, "as well a linear" should read -- as well as linear --; line 71, "filled" should read -- filler --. Column 2, line 22, "my be reacted" should read -- may be reacted --; line 38, "and an intermediates" should read -- and as intermediates --. Column 3, line 21, "groups one one" should read -- groups on one --. Column 8, line 55, the formula should appear as shown below:

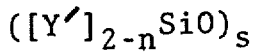

line 62, beginning with "where Y'' is" cancel all to and including "group being", and insert -- where Y'' is $[Y']_{3-n}SiO([Y'']_{2-n}SiO)_r$ and Y' respectively, with at least one $[Y']_{3-n}SiO([Y'']_{2-n}SiO)_r$ group being --. Column 9, line 33, the formula should appear as shown below:

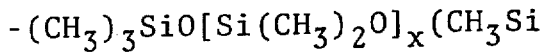

Column 10, line 71, "Y''" should read -- Y' --. Column 14, line 13, "wth" should read -- with --.

Signed and sealed this 25th day of November 1969.

(SEAL)  
Attest:

EDWARD M. FLETCHER, JR.  
Attesting Officer

WILLIAM E. SCHUYLER, JR.  
Commissioner of Patents